(12) United States Patent
Han

(10) Patent No.: US 10,365,699 B2
(45) Date of Patent: Jul. 30, 2019

(54) COMPUTER CASE COOLING STRUCTURE

(71) Applicant: EVGA CORPORATION, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 0 days.

(21) Appl. No.: 15/696,114

(22) Filed: Sep. 5, 2017

(65) Prior Publication Data
US 2019/0073005 A1  Mar. 7, 2019

(51) Int. Cl.
*G06F 1/18* (2006.01)
*G06F 1/20* (2006.01)

(52) U.S. Cl.
CPC .............. *G06F 1/206* (2013.01); *G06F 1/181* (2013.01)

(58) Field of Classification Search
CPC ............ G06F 1/181–182; G06F 1/206; H05K 7/20218–20381; H05K 7/20409–20418; H05K 7/20009–202; H05K 5/0247; H05K 7/20172; H01L 23/367–3677; H01L 23/473; H01L 23/46–467
USPC ...... 361/676–678, 679.46–679.54, 688–723; 165/80.1–80.5, 104.33, 185; 174/15.1–15.3, 16.1–16.3, 547, 548; 257/712–722, E23.088; 24/453, 458–459; 454/184; 312/236
See application file for complete search history.

(56) References Cited

U.S. PATENT DOCUMENTS

| | | | | |
|---|---|---|---|---|
| 5,796,580 A * | 8/1998 | Komatsu | ............ | H05K 7/20727 361/679.47 |
| 6,097,591 A * | 8/2000 | Ircha | ...................... | G06F 1/181 312/223.2 |
| 6,381,138 B1 * | 4/2002 | Chen | ...................... | G06F 1/181 312/223.2 |
| 2001/0046122 A1 * | 11/2001 | Nygard | ............... | E05B 73/0082 361/726 |
| 2002/0149910 A1 * | 10/2002 | Lee | ........................... | G06F 1/20 361/679.47 |
| 2003/0168034 A1 * | 9/2003 | Nakajima | .............. | B60K 11/04 123/198 B |
| 2004/0004812 A1 * | 1/2004 | Curlee | .................... | G06F 1/181 361/679.48 |
| 2004/0105226 A1 * | 6/2004 | Geeng | ..................... | G06F 1/181 361/679.02 |

(Continued)

*Primary Examiner* — Anthony M Haughton
*Assistant Examiner* — Razmeen Gafur
(74) *Attorney, Agent, or Firm* — Leong C. Lei

(57) ABSTRACT

A computer case cooling structure, including: a case body; at least one control element, configured on a long edge side of the case body; a partition plate, configured inside the case body, thereby dividing the inside of the case body into a first cooling space and second cooling space; a cover body, coupled pivotally to one side of the cover body, thereby rotatable around a shot edge side of the case body; a cooling door assembly, configured movably on the case body; a first fan assembly, configured on the case body and corresponding to the first cooling space; and a second fan assembly, configured on the case body and corresponding to the second cooling space. Whereby, the heat generated from interface cards can be discharged through the first cooling space, and the heat generated from a central processing unit the second cooling space, achieving independent cooling without interference.

6 Claims, 9 Drawing Sheets

(56) References Cited

U.S. PATENT DOCUMENTS

| | | | |
|---|---|---|---|
| 2004/0196623 A1* | 10/2004 | Erickson | G06F 1/181 361/679.59 |
| 2004/0218353 A1* | 11/2004 | Imsand | G06F 1/1601 361/679.55 |
| 2005/0052828 A1* | 3/2005 | Chang | G06F 1/181 361/679.02 |
| 2005/0068723 A1* | 3/2005 | Squillante | G06F 1/181 361/679.46 |
| 2005/0252672 A1* | 11/2005 | Kleinecke | H05K 7/20572 174/17 VA |
| 2006/0061949 A1* | 3/2006 | Chen | G06F 1/181 361/679.02 |
| 2006/0067040 A1* | 3/2006 | Imsand | G06F 1/1601 361/679.29 |
| 2006/0193109 A1* | 8/2006 | Bander | G06F 1/1607 361/679.27 |
| 2006/0209500 A1* | 9/2006 | Park | G06F 1/181 361/679.6 |
| 2008/0296000 A1* | 12/2008 | Lyon | G06F 1/186 165/104.33 |
| 2008/0315732 A1* | 12/2008 | Lai | G06F 1/181 312/223.2 |
| 2011/0273835 A1* | 11/2011 | Katakura | G06F 1/181 361/679.33 |
| 2013/0160372 A1* | 6/2013 | Chen | G06F 1/181 49/386 |
| 2014/0078668 A1* | 3/2014 | Goulden | H05K 7/20736 361/679.47 |
| 2014/0307375 A1* | 10/2014 | Mann | G06F 1/20 361/679.02 |
| 2014/0364048 A1* | 12/2014 | Milligan | H05K 7/20736 454/184 |
| 2015/0261268 A1* | 9/2015 | Gong | G06F 1/206 361/679.5 |
| 2016/0295095 A1* | 10/2016 | Jannard | H04N 5/2252 |
| 2017/0257976 A1* | 9/2017 | Chen | H05K 7/202 |
| 2017/0311486 A1* | 10/2017 | Milligan | H05K 7/20736 |
| 2017/0325354 A1* | 11/2017 | Lee | H05K 7/18 |
| 2018/0054922 A1* | 2/2018 | Leigh | H05K 7/1445 |

* cited by examiner

COMPUTER CASE COOLING STRUCTURE

(a) TECHNICAL FIELD OF THE INVENTION

The present invention relates to a computer case cooling structure, and more particularly to a cooling structure for a computer case, having a very good cooling effect and eye-appealing appearance, the state inside the case capable of being seen easily.

(b) DESCRIPTION OF THE PRIOR ART

The operation speed of current computers is increased continuously, resulting in the continuous rise of the heat generation rate of the electronic components inside computer mainframes. To prevent the electronic components inside computer mainframes from overheating to cause the temporary or permanent failure thereof, the electronic components inside a computer capable of being cooled effectively is very important.

In conventional desktop computers, all main heat generating elements such as a central processing unit (CPU), display card, hard disk and power supply are gathered in the same space due to the limitation of a standardized motherboard (e.g. ATX/u-ATX/Min-itx), and heat generated from them are discharged in a united way so that all the heat cannot be discharged quickly and effectively or regional heat accumulation occurs.

Furthermore, mutual interference will also occur among these hear sources, causing the temperature to be increased continuously, and resulting in the low cooling efficiency of computer hosts.

In addition, the front of a computer case usually is a short edge side thereof so that the computer case will be protruded out with a part of it if the placement location thereof is not deep enough, which is very ugly, and the short edge side of a general computer case is placed as a front face facing a user so that the user will not and is also unable to observe the state inside the computer case.

SUMMARY OF THE INVENTION

To overcome the defects mentioned above, and improve the heat dissipation of a computer case, the present invention is proposed.

An objective of the present invention is to provide a computer case cooling structure, capable of strengthening a cooling effect through the design of a cooling door assembly, and achieving more cooling passages.

To achieve the object mentioned above, the present invention proposes a computer case cooling structure, including: a case body; at least one control element, configured on a long edge side of the case body; a partition plate, configured inside the case body, thereby dividing the inside of the case body into a first cooling space and second cooling space; a cover body, coupled pivotally to one side of the cover body, thereby rotatable around a shot edge side of the case body; a cooling door assembly, configured movably on the case body; a first fan assembly, configured on the case body and corresponding to the first cooling space; and a second fan assembly, configured on the case body and corresponding to the second cooling space. Whereby, the heat generated from interface cards can be discharged through the first cooling space, and the heat generated from a central processing unit the second cooling space, achieving independent cooling without interference. Furthermore, if the cooling effect is intended to more strengthen, the heat can be discharged by opening the cooling door assembly. In addition, because the control elements are configured on the long edge side, the case body can be placed transversely to make the long edge side face a user, thereby allowing the user to see the inside state of the case body so that problems occurring inside the case body can be dealt with.

DETAILED DESCRIPTION OF THE PREFERRED EMBODIMENTS

Figure 1:
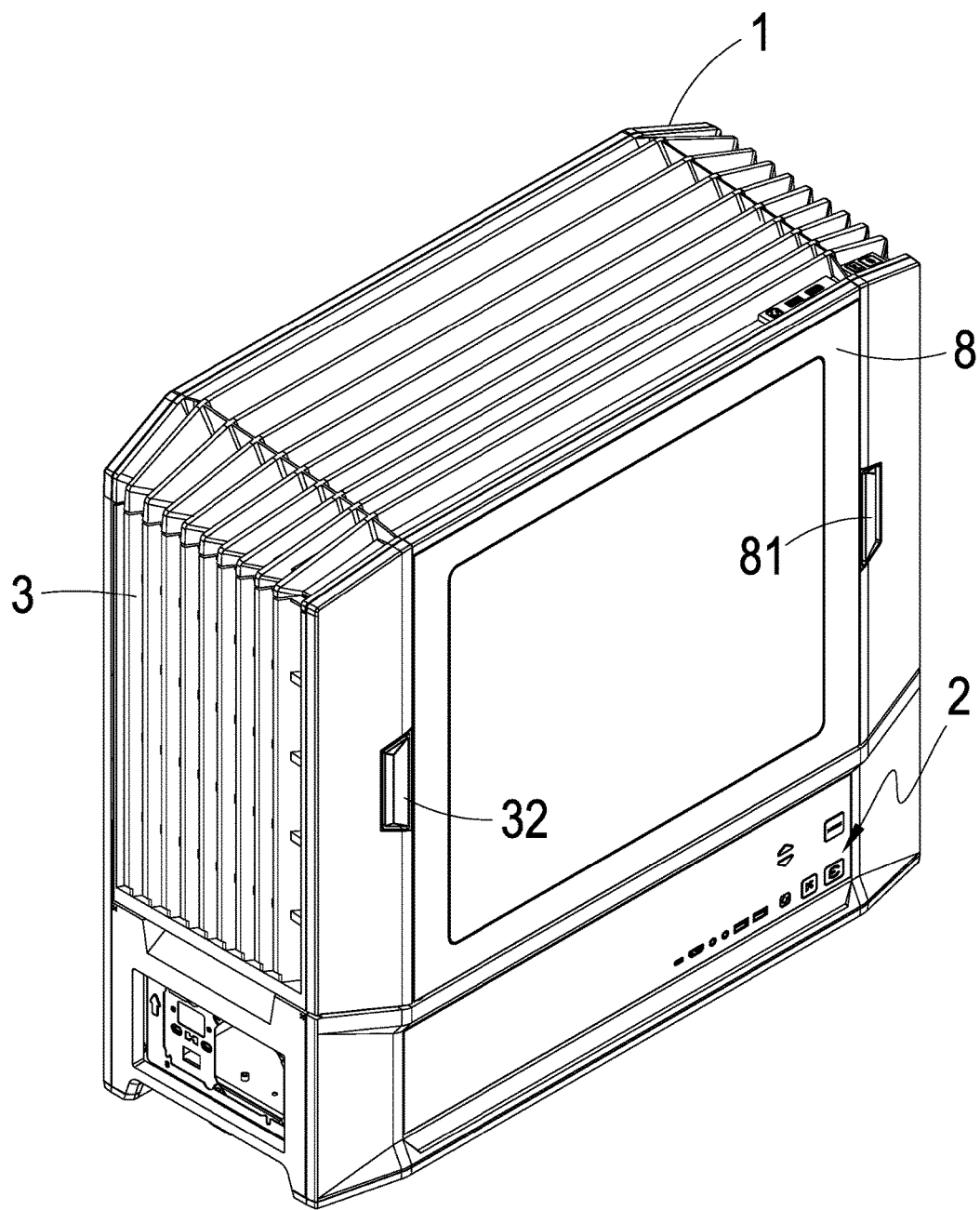
FIG. 1 is a perspective view of a preferred embodiment of the present invention.
Figure 2:
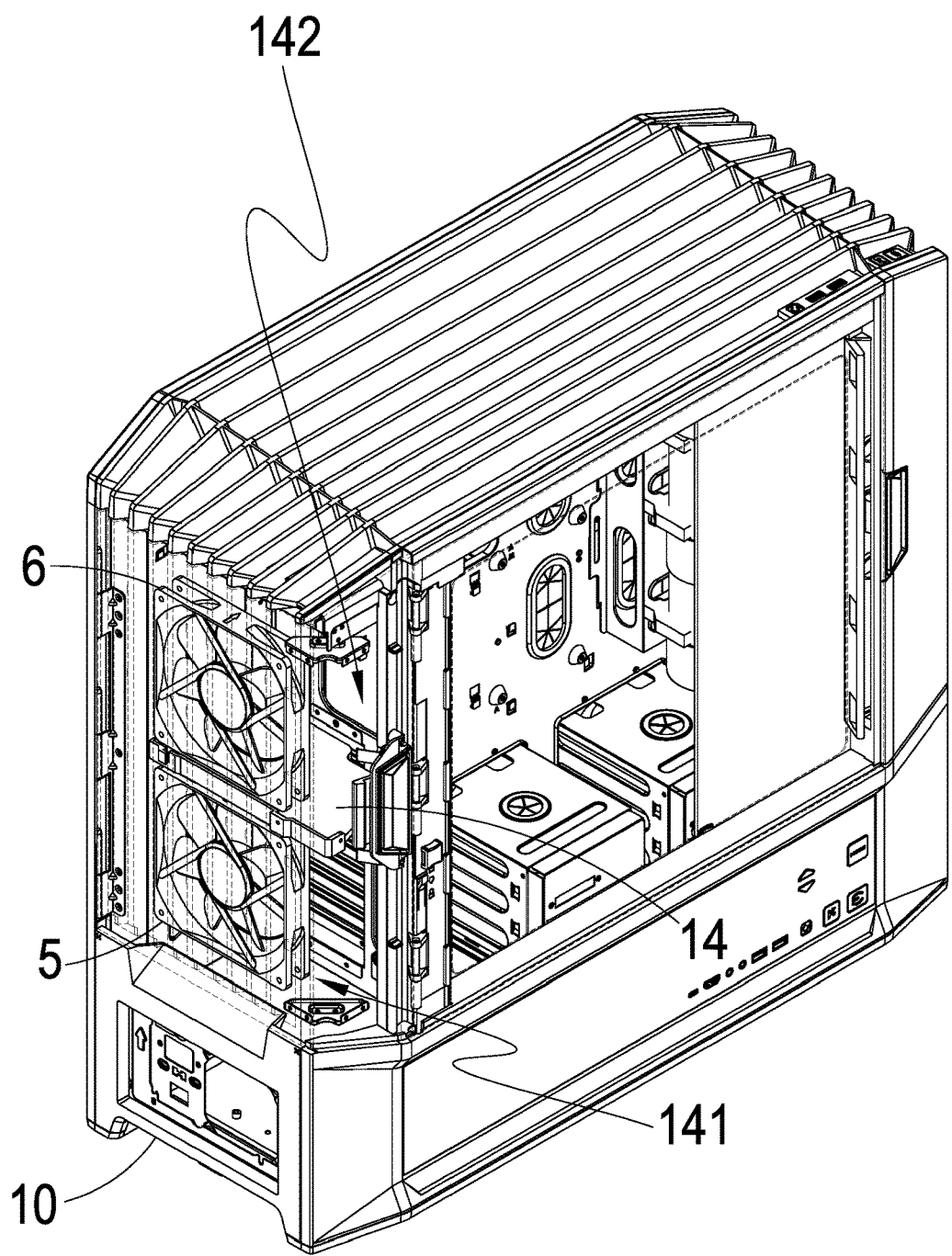
FIG. 2 is a perspective view of the embodiment of the present invention, showing component inside.
Figure 3:
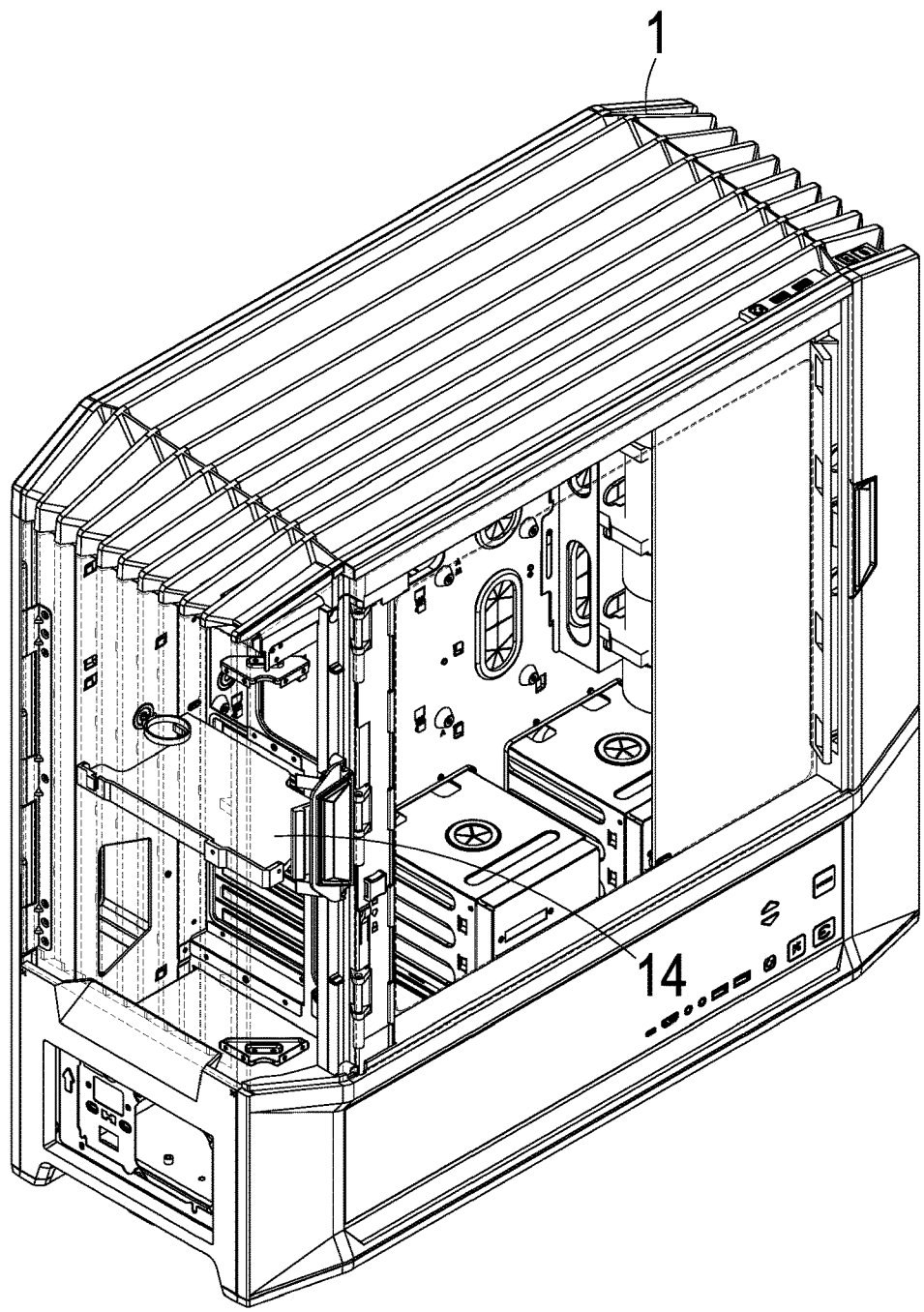
FIG. 3 is a perspective view of the embodiment of the present invention, where a partition plate is shown.
Figure 4:
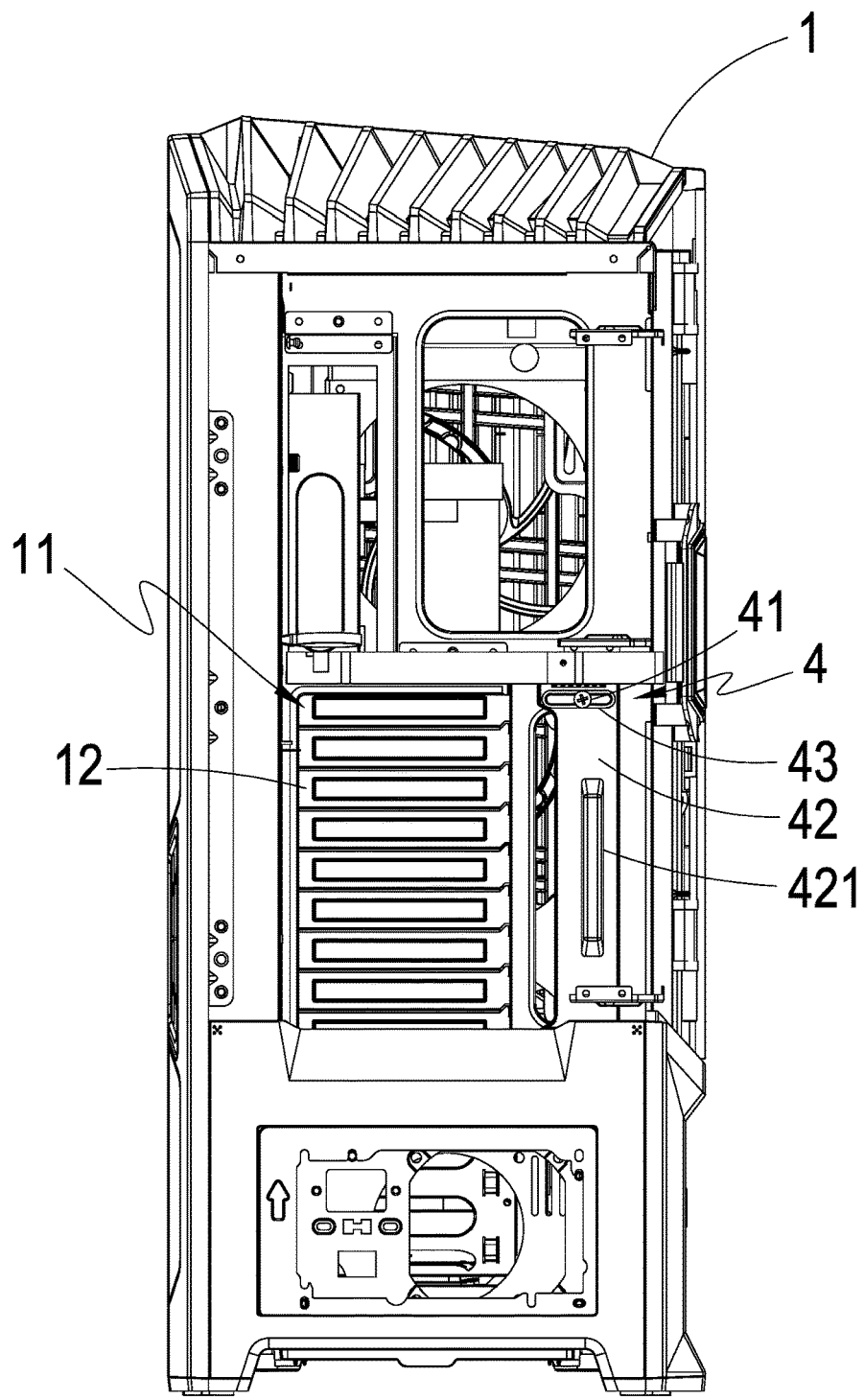
FIG. 4 is a schematic view of the embodiment of the present invention, where a cooling door assembly is shown.
Figure 5:
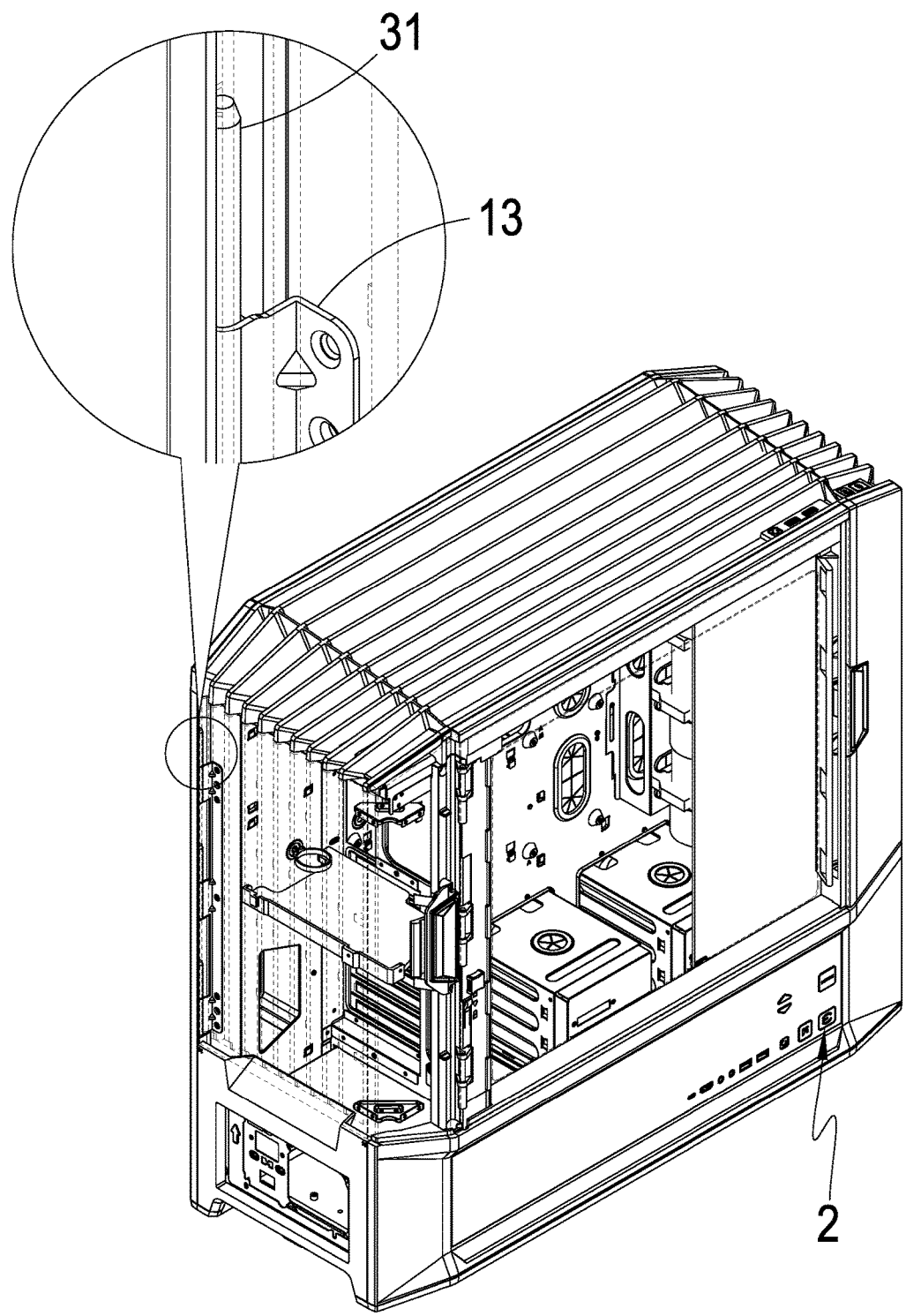
FIG. 5 is a perspective view of the embodiment of the present invention, where the enlarged view a cover body pivot is shown.
Figure 6:
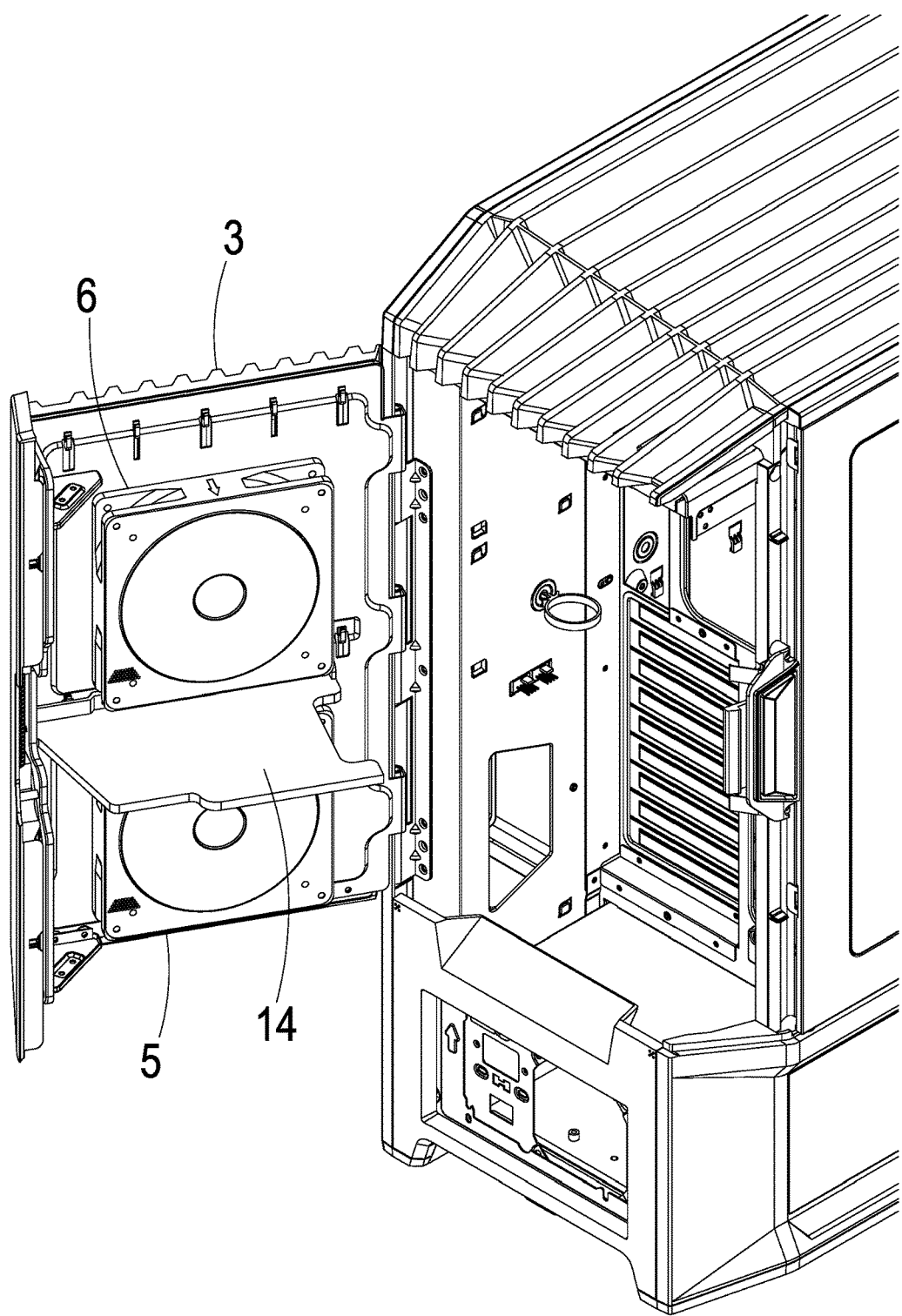
FIG. 6 is a perspective view of the embodiment of the present invention, where a cover door is in an open state.
Figure 7:
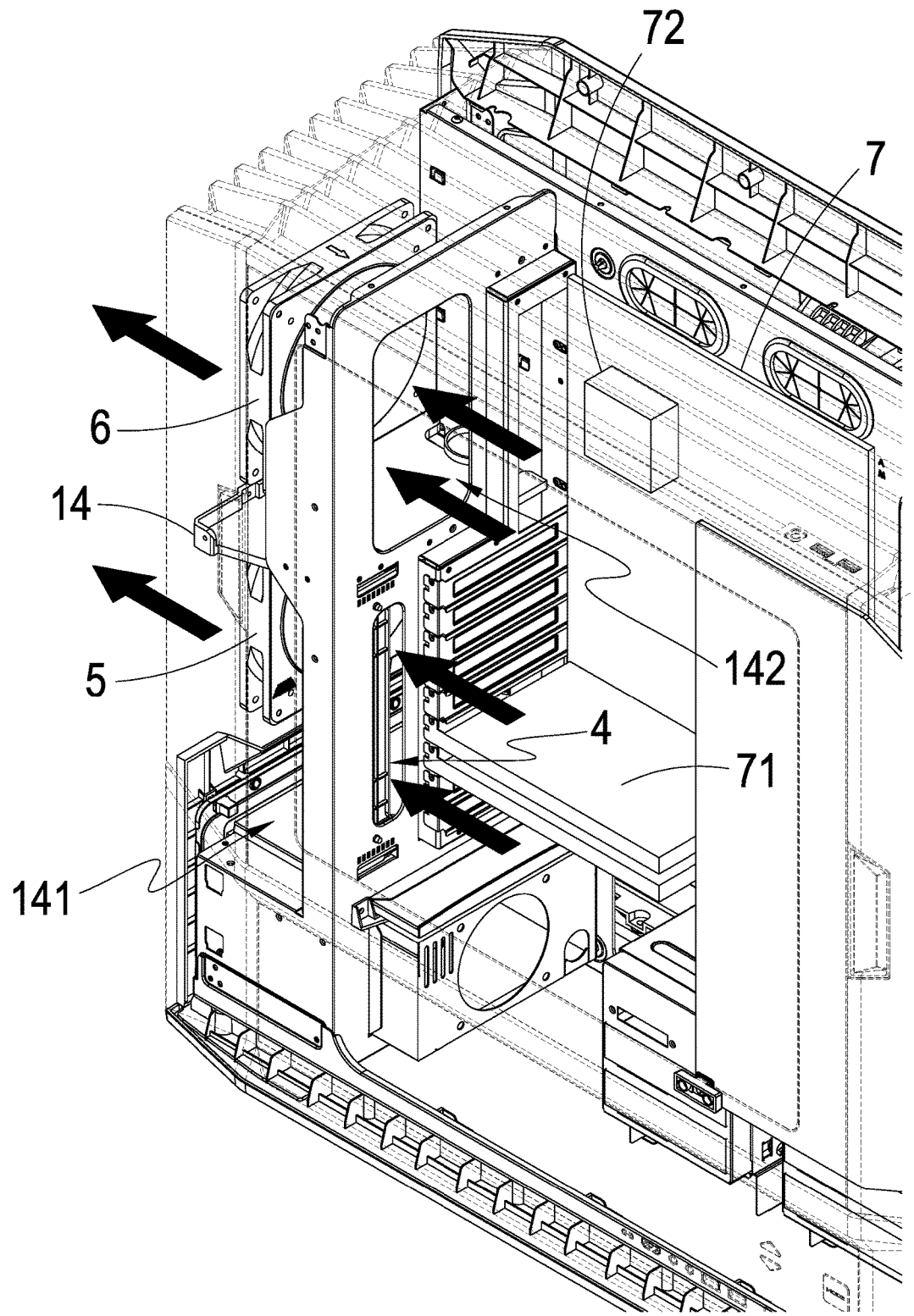
FIG. 7 is a perspective view of the embodiment of the present invention, where a cooling wind direction (arrow) is shown.
Figure 8:
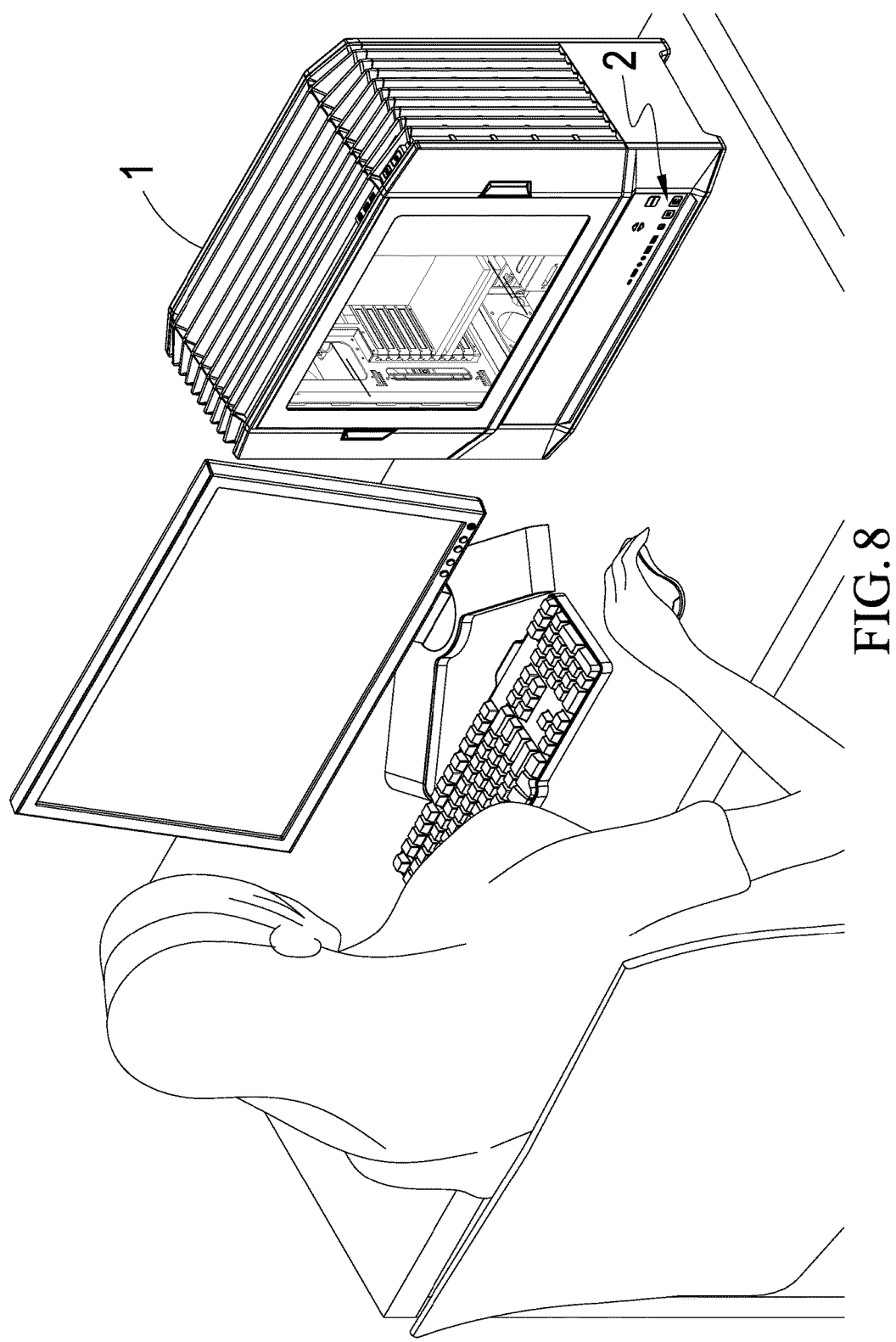
FIG. 8 is a perspective view of the embodiment of the present invention, the case body being placed transversely.

Referring to FIGS. 1 to 5, a computer case cooling structure of the present invention includes: a case body 1, having an insertion area 11 allowing interface card connectors to be exposed, a plurality of blocking sheets 12 positioned at the same side as a cooling door assembly 4 mentioned below and configured on the insertion area 11, and at least one pivot 13 configured on the case body 1; at least one control element 2, configured on a long edge side of the case body 1; a partition plate 14, positioned inside the case body 1, thereby dividing the inside of the case body 1 into a first cooling space 141 and second cooling space 142, and the partition plate 14 being in connection with or integrated with the case body 1; a cover body 3, coupled pivotally to one side of the case body 1, thereby rotatable around a short edge side 10, the cover body 3 having at least one rotating shaft 31 engaged with and coupled pivotally to the pivot 13, and one side of the case body 3 configured with a button switch 32 adapted to open or close the case body 3; the cooling door assembly 4, movably configured on the case body 1, and comprising a limit element 41, a door panel 42 having a toggle switch 421, and at least one engagement groove 43 configured on the door panel 42 in engagement with the limit element 41; a first fan assembly 5, configured on the case body 1 and corresponding to the first cooling space 141; a second fan assembly 6, configured on the case body 1 and corresponding to the second cooling space 142; and a maintenance cover 8, configured on the case body 1 and positioned on one side thereof different from the cover body 3, one side of the maintenance cover 8 having a key switch 81 for the convenient opening or closing of the maintenance cover 8.

Referring to FIGS. 1 to 8, the case body 1, in the embodiment, further accommodates a circuit board 7, interface cards 71 inserted in the circuit board 7, and a central processing unit (CPU) 72 in electric connection with the circuit board 7, and the control elements 2 respectively are a power switch, reassembly button or the like for the circuit board 7 so that a user may place the case body 1 transversely because the control elements 2 are configured on the long edge side of the case body 1, and may further observe directly the operation states of the components such as the interface cards 17 and CPU 72 inside the case body 1 if the case body 1 is transparent, for example, state light display colors. In addition, the heat generated from the starting of the circuit board 7 and interface cards 71 with the control elements 2 can be discharged separately because the partition plate 14 separates the cooling passage of the interface card 71 from the one of the CPU 72, i.e. the heat generated from the interface cards 71 can be independently discharged through the first cooling space 141 with the first fan assembly 5, and the heat generated from the CPU 72 through the second cooling space 142 with the second fan assembly 6, thereby strengthening the cooling effect. In addition, the cooling can further be carried out through the cooling door assembly 4; only toggling the toggle switch 42 configured on the door panel 42 can move the limit element 41 to slide along the engagement groove 43, and the door panel 42 can then be opened to discharge the heat besides the first fan assembly 5 and second fan assembly 6.

Especially, the cover body 3 can be rotated to open transversely through the operation of the rotating shaft 31 in coordination with the pivot 13, which is very convenient and occupies no space.

Furthermore, because the plurality of blocking sheets 12 are configured on the insertion area 11, and the blocking sheet 12 corresponding to a connector of the interface card 7 can be detached off to allow the connector to be exposed for external insertion. More importantly, the insertion area 11 is only configured with the detachable blocking sheets 12 without any cross bar so that the production cost can be reduced.

Figure 9:
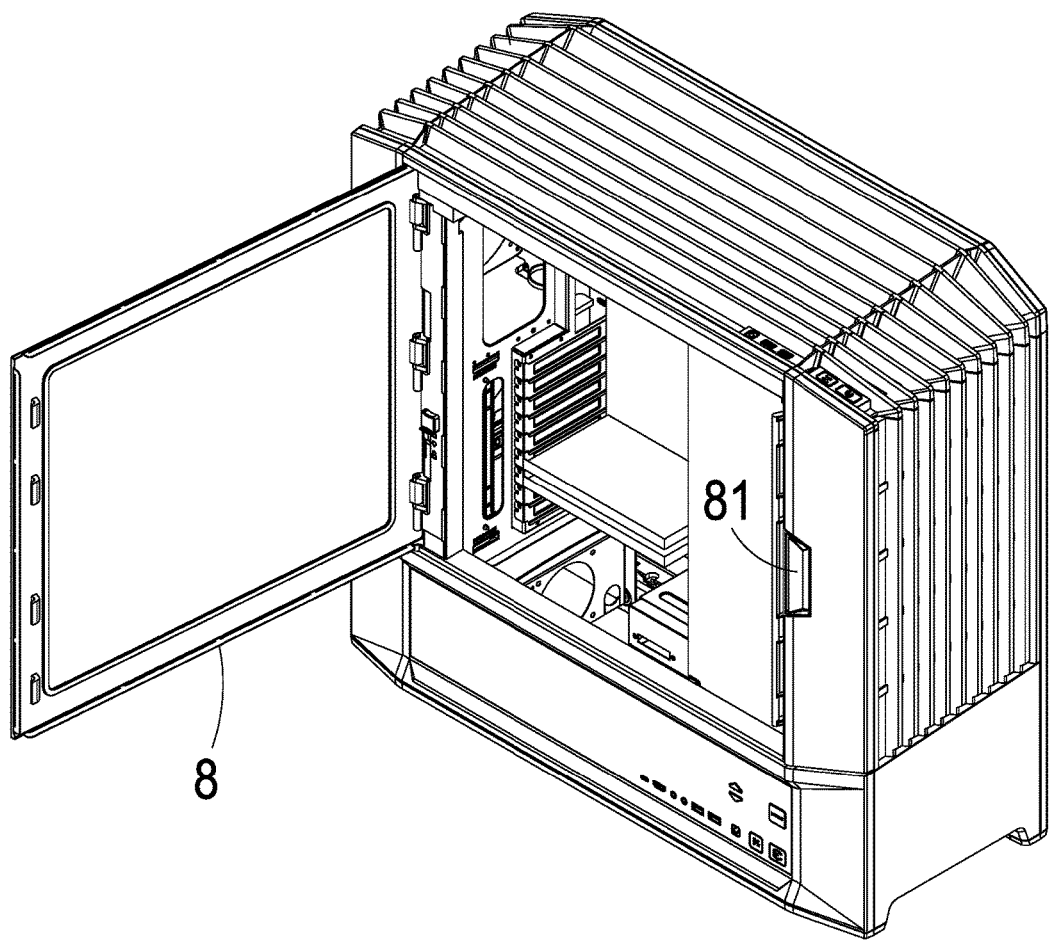
FIG. 9 is a perspective of the embodiment of the present invention, where a maintenance cover is opened.

Referring to FIG. 9, a user can press the key switch 81 directly, and one side of the maintenance cover 8 can then be bounced and unlocked so that the user can take down the maintenance cover 8 quickly when they want to maintain the interface cards, circuit boards or CPU, which is very convenient.

From the description mentioned above, it can be clearly known that the present invention has the following advantages over the prior arts:

1. allowing users to clearly and easily observe the inside state of the case body 1 through the configuration of the control element 2 on a long edge side of the case body 1 so that the case body 1 can be placed in such a way that is different from conventional computer cases.

2. capable of cooling the interface card 71 and CPU 72 separately through the design of the partition plate 14, thereby improving the cooling effect;

3. unnecessary to find a place painstakingly to place the cover body 3 by opening the cover body 3 in a rotation way, avoiding taking up space; and 4. capable of strengthening the cooling function through the design of the cooling door assembly 4, thereby having more cooling passages.

I claim:

1. A computer case cooling structure, comprising:
 a case body;
 at least one control element, configured on a long edge side of said case body;
 a partition plate, configured inside said case body, thereby dividing the inside of said case body into a first cooling space that defines a first airflow passage and second cooling space that defines a second airflow passage;
 a cover body, coupled pivotally to one side of said cover body, thereby rotatable around a shot edge side of said case body;
 a cooling door assembly, configured movably on said case body such that the cooling door assembly is movable between a closed position where the cooling door assembly closes the second airflow passage and an open position where the cooling door assembly opens the second airflow passage;
 a first fan assembly, configured on said case body and corresponding to said first cooling space to generate a first airflow movable through the first airflow passage; and
 a second fan assembly, configured on said case body and corresponding to said second cooling space to generate a second airflow movable through the second airflow passage for secondary cooling, wherein the first and second fan assemblies discharge heat in a direction along the long edge side of the case body;
 wherein said cooling door assembly comprises at least one limit element configured on said case body, a door panel, and at least one engagement groove configured on said door panel, said engagement groove in engagement with said limit element;
 wherein a toggle switch is configured on said door panel adapted to be operated to move said limit element along said engagement groove to selectively open said door panel so as to set said cooling door assembly in the open position and open the second airflow passage that provides the secondary cooling;
 wherein said partition plate is arranged to define the first and second airflow passages of said case body that are respectively on opposite sides of said partition plate and are separated from each other by said partition plate, wherein said cooling door assembly is arranged to close said second airflow passage in such a way that said cooling door assembly is movable to the open position to open said airflow passage, selectively allowing air to flow through both said first and second airflow passages; and
 wherein an insertion area allowing interface card connectors to be exposed out is configured on said case body and wherein a plurality of blocking sheets are configured on said insertion area.

2. The structure according to claim 1, wherein at least one pivot is configured on said case body, and at least one rotating shaft said cover body, with said rotating shaft engaged with and coupled pivotally to said pivot.

3. The structure according to claim 1, wherein said partition plate is in connection with or integrated with said case body.

4. The structure according to claim 1, wherein a button switch is configured on one side of said case body, thereby convenient for opening or closing said case body.

5. The structure according to claim 1, wherein a maintenance cover is configured on one side of said case body different from the one configured with said cover body.

6. The structure according to claim 5, wherein a key switch is configured on one side of said maintenance cover, thereby convenient for opening or closing said maintenance cover.

* * * * *